United States Patent [19]

Samowich

[11] Patent Number: 4,510,200

[45] Date of Patent: Apr. 9, 1985

[54] BULLET-PROOF PROTECTIVE SHIELDING AND GARMENTS AND METHODS OF MAKING THE SAME AND USE THEREOF

[76] Inventor: Joseph J. Samowich, 33 Greenwich Ave., New York, N.Y. 10014

[21] Appl. No.: 412,696

[22] Filed: Aug. 30, 1982

Related U.S. Application Data

[63] Continuation-in-part of Ser. No. 356,656, Mar. 10, 1982, Pat. No. 4,409,275, which is a continuation-in-part of Ser. No. 537,445, Dec. 30, 1974, Pat. No. 4,329,386.

[51] Int. Cl.³ .................................................. B32B 5/18
[52] U.S. Cl. ............................................ 428/252; 2/2.5; 109/49.5; 156/307.5; 156/307.7; 428/314.2; 428/317.5; 428/911
[58] Field of Search ............................ 2/2.5; 109/49.5; 156/64, 78, 79, 219, 307.3, 307.5, 307.7; 428/252, 314.2, 317.5, 317.7, 902, 911

[56] References Cited

U.S. PATENT DOCUMENTS

| Re. 28,682 | 1/1976 | Hoey | 428/196 |
| 3,804,700 | 4/1974 | Hoey | 428/196 |
| 4,079,464 | 3/1978 | Roggin | 2/2.5 |
| 4,200,677 | 4/1980 | Bottini et al. | 428/252 X |

OTHER PUBLICATIONS

Press (Ed.), "Man-Made Textile Encyclopedia", New York: Textile Book Publishers, Inc. (1959), pp. 346-347.

*Primary Examiner*—Robert Dawson
*Attorney, Agent, or Firm*—Nolte, Nolte and Hunter

[57] ABSTRACT

Material useful in bullet-proof clothing is formed from a number of laminates arranged one on top of another. The laminates are preferably formed of a substrate coated with a crushed thermosettable foam that is, in turn, covered with a surface film, which may be an acrylic polymer. The films should form the outermost layers of the composite material which, together with the foam layer, prevent degradation of the substrate, which is typically formed of fabric woven from Kevlar.

29 Claims, No Drawings

BULLET-PROOF PROTECTIVE SHIELDING AND GARMENTS AND METHODS OF MAKING THE SAME AND USE THEREOF

This application is a continuation-in-part of copending application Ser. No. 356,656, filed March 10, 1982, now U.S. Pat. No. 4,409,275, which is a continuation-in-part of application Ser. No. 537,445, filed Dec. 30, 1974, now U.S. Pat. No. 4,329,386.

This invention concerns itself with bullet-proof protective shielding and garments, also known as soft body armor, made of a plurality of superimposed laminates.

One of the more successful bullet-proof vests in use today by a number of municipal police departments for Threat Level 1, or Type 1, use comprises a garment made of eight or more layers of a woven fabric produced with aDu Pont de Nemours E I & Co. yarn called "Kevlar". In the manufacture of Threat Level 1, or Type 1, Kevlar fabric, yarn of 1,000 denier are woven with 31, ends and 31 picks per square inch. Fabric made of Kevlar is relatively expensive, and it has been determined in the field that the wearer of a bullet-proof vest made only of woven fabric layers, such as Kevlar, experiences bullet impact injuries such as broken ribs and the like; i.e., blunt trauma.

The specifications and tests for Threat Level 1, or Type 1, body armor are set forth in the National Institute of Justice Standards, NILECJ-STD-0101-0.01, dated Dec., 1978 and in the Selection and Application Guide to Police Body Armor, National Institute of Justice, September 1981.

The present invention provides a bullet-proof shield or garment composed of a plurality of superimposed laminates, each laminate being made in the manner disclosed in my prior patent and application; that is, each laminate is formed of a substrate, which may be fabric such as Kevlar, an intermediate layer preferably of foamed cross-linkable acrylic polymer and a clear or opaque cross-linkable or thermosettable film, preferably acrylic. The various methods of forming the individual laminates are discussed thoroughly in my previous patent and in the aforementioned application. The method basically comprises foaming an emulsion and applying it to a substrate, drying it, selfbonding a plastic film to the foam and, before or after bonding the film to the foamed emulsion, crushing the foam. It has also been found that the basic emulsion of the intermediate layer need not be beaten to the point where it has foamed but may be used in the form of a wet, sticky layer, the idea being to have the intermediate layer and film cross link upon bonding. Preferably, the intermediate layer should be flexible.

One of the difficulties encountered in the use of Kevlar and Kevlar-type woven fabrics is that they are susceptible to deterioration due to the effects of abrasion, moisture, or sunlight and, thus, must be encased in moisture-proof and light-proof coverings, particularly if they are to be used as bullet-proof shields or garments.

As pointed out in my U.S. Pat. No. 4,409,275, the film of my laminate actually encapsulates the intermediate layer and protects it from abrasion and moisture. Also, as disclosed in my co-pending application, the film need not be transparent and may have its undersurface printed with inks to prevent light from affecting the intermediate layer. Of course, in the application of such laminates to the present invention, the foam, in the first instance, and the film and foam in the complete composite laiminate, which overlie the woven substrate, which may be Kevlar, again protects the Kevlar or any other woven material used from light and moisture.

As can be appreciated, if the laminates of my invention are superimposed one upon the other, then each succeeding fabric layer is covered by the next laminate and further protection of the woven fabric against ambient influences is provided.

In preparing laminates for testing in accordance with the guidelines and standards identified above, the laminates were made with a clear or opaque cross-linkable or thermosettable film, preferably acrylic, that had been cast on silicone-coated release paper. The film, of course, is in a dried condition, but without having been thermoset before applying it to the foam layer. Of course, the film layer may be coated upon the intermediate layer and permitted to dry and, indeed, a second layer of film may be placed over the coated layer. The foam layer is made of a similar cross-linkable acrylic polymer which has been foamed and applied to a substrate; in this instance, a layer of Kevlar woven fabric. As disclosed in my aboveidentified patents, the foam is crushed and the film and foam are heated sufficiently to cross link the polymers.

I prepared two (2) such laminates using Kevlar fabric woven as above and superimposed the layers one on the other with the outer surface of the film of the top laminate exposed and the outer surface of the fabric of the bottom laminate also exposed, thereby resulting in a multi-laminate stack with the layers arranged as follows:

Film
Foam
Kevlar
Film
Foam
Kevlar

I then folded the superimposed laminates as formed above to juxtapose the two halves of the Kevlar substrates and clipped the free ends of the folded laminates together, thereby presenting a folded, multi-laminate stack with the layers of the laminates disposed as follows:

Film
Foam
Kevlar
Film
Foam
Kevlar
Kevlar
Foam
Film
Kevlar
Foam
Film

The film layer at the top of this stack may be the exterior surface and can be colored brown, for example, to simulate leather, while the bottom film layer would be against the body of the wearer and could be made clear.

The invention also contemplates the use of a top laminate of film, foam, substrate followed by underlying laminates not employing the film layer; e.g., layers of foam and substrate only.

The laminates with which I worked were fifty-four (54) inches wide by approximately 2 yards in length and the composite folded multi-laminate measured 12 ¾ inches by 20 ¼ inches. The thickness of each laminate is comparable to that as disclosed in U.S. Pat. No.

4,329,386, with the composite multi-laminate shield having a summed thickness.

Although the laminate need not have been folded in the manner just discussed; that is, the laminates may be superimposed one on the other for as many layers as desired, the folded structure did provide film that provides protection from light and moisture on both sides of the shield, and acts as a cushion to reduce the blunt trauma effect on the body.

The folded shield was tested in accordance with the procedures and standards identified above. In one test, five 0.38 caliber shots were fired at the folded shield at a distance of sixteen (16) feet and the bullets bounced off of the film surface which initially received the bullets.

I theorize that the film of the laminate has its own level of bullet penetration resistance and that the foam provides a cushioning effect when the bullet strikes the shield of the invention. The Kevlar substrate has a high level of bullet force resistance and absorbs the impact in the film and foam layers.

In another test, five (5) 0.38 caliber, 158 grain, Police Special, round nose lead bullets were fired at the shield with a Smith & Wesson at a distance of sixteen (16) feet and struck the shield about 2 inches apart. All bullets bounced off and did not penetrate the shield.

In all instances, when the 0.38 caliber bullets were fired, these tests proved not only the viability of, but the superiority of, the multi-laminate shield of the invention when compared with the shields made of Kevlar alone. This shows that blunt trauma can be reduced, while also reducing costs, since fewer layers are required when compared to the shields made of Kevlar alone. Even for other Threat Levels, such as Type IIA, II and III, when more than the four multi-layers described above may have to be used, the number of layers required, regardless of threat level, will be less than the corresponding layers of Kevlar alone when employing the film-foam technology.

Those skilled in the art will note that the arrangement of the individual laminates of the multi-laminate shield of the invention can be varied and various materials substituted for the emulsions and substrates with which I have worked. The invention, therefore, is to be defined only by the claims now to be set forth.

I claim:

1. A soft body armor protective shield or garment comprising a plurality of laminates superimposed one on the other, each laminate comprising a plastic surface film adhered to a layer of a cross-linked thermoset resilient emulsion adhered to a substrate of high force resistance fabric.

2. The shield of claim 1, wherein said film is a thermoset acrylic polymer and said layer is a crushed foam thermoset emulsion polymer.

3. The shield of claim 2, wherein said substrate is a woven textile fabric.

4. The shield of claim 3, wherein said woven textile fabric is Kevlar.

5. The shield of claim 3, wherein said woven textile fabric is 1,000 denier having 31 ends and 31 picks per square inch.

6. The shield of claim 1, wherein said plastic surface film of each laminate faces in the same direction.

7. The shield of claim 1, wherein said plastic film of at least one of said laminates faces in one direction and the plastic film of another of said laminates faces in the opposite direction.

8. The shield of claim 1, wherein said plurality comprises at least four laminates.

9. The shield of claim 7, wherein said plurality comprises at least four laminates, the plastic surface film of at least two of which face one direction and the plastic surface films of the other two laminates face in the opposite direction.

10. The shield of claim 1, wherein means are provided with said film to render the same light impervious.

11. A soft body armor protective shielding comprising a plurality of laminates superimposed one on the other, at least one of said laminates comprising a plastic surface film adhered to a layer of a cross-linked thermoset resilient emulsion adhered to a substrate of high force resistance fabric.

12. The shielding of claim 11, wherein said film comprises a thermoset acrylic polymer and said layer is a crushed foam thermoset emulsion polymer.

13. The shielding of claim 12, wherein said at least one of said laminates is the topmost one of said superimposed laminates and said plastic surface film is arranged facing outwardly.

14. The shielding of claim 11, wherein each laminate comprises a plastic surface film adhered to a layer of a cross-linked thermoset resilient emulsion adhered to a substrate of high force resistance fabric and wherein said plastic surface film of each laminate is arranged to face in the same direction.

15. The shielding of claim 11, wherein each laminate comprises a plastic surface film adhered to a layer of a cross-linked thermoset resilient emulsion adhered to a substrate of high force resistance fabric and wherein said plastic surface film of at least one of said plurality of laminates is arranged to face one direction and said plastic surface film of another laminate is arranged to face in the opposite direction.

16. The shielding of claim 15, wherein said plurality of laminates comprises at least four laminates, the plastic surface films of at least two of which face in one direction and the plastic surface films of the other two face in the opposite direction.

17. The method of fabricating a soft body armor bullet-proof shield or garment comprising the steps of: forming a plurality of laminates, at least one of which is formed by adhering a layer of cross-linked thermoset emulsion to a substrate of high force resistance fabric and adhering a plastic surface film to the layer, and superimposing the plurality of laminates one upon the other.

18. The method of claim 17, including the further steps of forming the plastic surface film from a thermoset acrylic polymer and forming the layer from a crushed foam thermoset emulsion polymer.

19. The method of claim 18, wherein said substrate is a woven textile fabric.

20. The method of claim 18, including the further step of forming the substrate of Kevlar.

21. The method of claim 18, including the further step of forming the substrate of a woven textile fabric of 1,000 denier having 31 ends and 31 picks per square inch.

22. The method of claim 17, including the steps of forming each of the laminates by adhering a layer of cross-linked thermoset emulsion to a substrate of high force resistance fabric and adhering a plastic surface film to the layer and arranging the plastic surface film of each laminate to face in the same direction.

23. The method of claim 17, including the steps of forming each of the laminates by adhering a layer of cross-linked thermoset emulsion to a substrate of high force resistance fabric and adhering a plastic surface film to the layer and arranging the plastic film of at least one of the laminates to face in one direction and the plastic film of another of the laminates to face in the opposite direction.

24. The method of claim 17, including the step of forming at least four laminates.

25. The method of claim 23, including the step of forming at least four laminates, and arranging the plastic surface film of at least two of which to face in one direction and arranging the plastic surface films of the other two laminates to face in the opposite direction.

26. A protective shield or garment comprising a plurality of laminates superimposed one on the other, each laminate comprising a layer of a resilient emulsion adhered to a substrate of high force resistance fabric.

27. The shield of claim 26, wherein said layer is a crushed foam thermoset emulsion polymer.

28. The shield of claim 27, wherein said substrate is a woven textile fabric.

29. The shield of claim 27, in which a plastic surface film is adhered to the layer of at least one of said laminates.

* * * * *